(12) United States Patent
Edvardsson

(10) Patent No.: US 7,239,267 B2
(45) Date of Patent: Jul. 3, 2007

(54) MICROWAVE SEALING FOR RADAR LEVEL GAUGES

(75) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 68 days.

(21) Appl. No.: 10/957,279

(22) Filed: Oct. 1, 2004

(65) Prior Publication Data

US 2006/0071848 A1 Apr. 6, 2006

(51) Int. Cl.
*G01F 23/284* (2006.01)

(52) U.S. Cl. ................................ 342/124; 324/644

(58) Field of Classification Search ................ 342/124
See application file for complete search history.

(56) References Cited

U.S. PATENT DOCUMENTS

| | | | | |
|---|---|---|---|---|
| 3,019,281 | A | | 1/1962 | Hartwell ................. 174/35 |
| 4,287,497 | A | * | 9/1981 | Johnson ................. 333/261 |
| 4,800,387 | A | * | 1/1989 | Joy ..................... 342/165 |
| 4,831,331 | A | * | 5/1989 | De et al. ................ 324/338 |
| 5,107,071 | A | | 4/1992 | Nakagawa ............... 174/35 |
| 5,117,066 | A | * | 5/1992 | Balsells ............... 174/35 GC |
| 5,305,237 | A | * | 4/1994 | Dalrymple et al. ......... 702/55 |
| 5,495,218 | A | * | 2/1996 | Erb et al. ............... 333/248 |
| 5,507,181 | A | * | 4/1996 | Fox et al. .............. 73/290 V |
| 5,703,289 | A | * | 12/1997 | Mulrooney ............. 73/290 V |
| 5,770,990 | A | * | 6/1998 | Lubbers ................. 333/252 |
| 5,872,494 | A | * | 2/1999 | Palan et al. ............. 333/252 |
| 6,005,396 | A | * | 12/1999 | Suyama et al. ........... 324/639 |
| 6,155,112 | A | * | 12/2000 | Eckert et al. ............ 73/290 V |
| 6,266,022 | B1 | * | 7/2001 | Muller et al. ............ 343/703 |
| 6,325,391 | B1 | | 12/2001 | Smith et al. ............. 277/650 |
| 6,538,598 | B1 | * | 3/2003 | Wilkie et al. ............ 342/124 |
| 6,677,891 | B2 | * | 1/2004 | Fehrenbach et al. ....... 342/124 |
| 6,950,055 | B2 | * | 9/2005 | Edvardsson et al. ....... 342/124 |
| 2002/0066314 | A1 | | 6/2002 | Lubbers ................. 73/290 |
| 2003/0193441 | A1 | * | 10/2003 | Zimmerman et al. ....... 343/725 |
| 2005/0083229 | A1 | * | 4/2005 | Edvardsson et al. ....... 342/124 |
| 2005/0110699 | A1 | * | 5/2005 | Timofeev et al. ......... 343/797 |

FOREIGN PATENT DOCUMENTS

WO WO 2005/038414 4/2005

OTHER PUBLICATIONS

"International Search Report" for PCT/SE2005/001444.

* cited by examiner

*Primary Examiner*—Thomas H. Tarcza
*Assistant Examiner*—Matthew M. Barker
(74) *Attorney, Agent, or Firm*—Westerman, Champlin & Kelly, P.A.

(57) ABSTRACT

A radar level gauge system is disclosed, having a transmitter for transmitting measuring signals towards the surface of the filling material, a receiver for receiving echo signals from said surface and a fastening structure adapted to secure said transmitter and receiver in a measuring position on a feed-through structure located in an upper boundary of said container. Further, a sealing unit is arranged between said fastening structure and said feed-through, and adapted to provide a pressure seal between the inside and the outside of the container, and in addition, there is provided means for blocking electromagnetic energy, adapted to block net transfer of electromagnetic energy between the inside and the outside of the container through said sealing unit.

10 Claims, 4 Drawing Sheets

MICROWAVE SEALING FOR RADAR LEVEL GAUGES

FIELD OF THE INVENTION

The present invention relates to a radar level gauge system for determining the filling level of a filling material in a tank. Such a system could comprise a transmitter for emitting measuring signals towards the surface of the filling material; a receiver for receiving echo signals from the tank; and processing circuitry for determining the filling level of the tank based on said echo signal. In particular, the invention is concerned with the sealing at a flange on the tank and especially at the opening where the radar level gauge is located.

BACKGROUND OF THE INVENTION

Measuring the level of a liquid, fluids, granular compounds or other materials stored in a tank is a basic industrial need. Several technologies have historically been employed and the last decade radar has emerged as the dominating method for high quality measurements. These devices utilize antennas to transmit electromagnetic waves toward the material being monitored and to receive electromagnetic echoes which are reflected at the surface of the material being monitored. Today, numerous units for radar level gauging are installed worldwide, and among liquid level gauges the radar method has a growing percentage. The radar level gauges (RLGs) are typically mounted in tanks which can have a height from a few meter to 20–30 m or even more and with volumes from a few m$^3$ and up to 100 000 m$^3$ or more, typically located outdoors. High accuracy and reliability has been important virtues for RLGs.

Frequencies around 6, 10 and 26 GHz have typically been used, but other frequencies, such as in higher frequency bands, are feasible as well, such as near 60 and 80 GHz. Some RLGs use FMCW as the radar method (with a 1–2 GHz sweep, other use very short pulses (e.g. 0.5–1 ns) and it is expected that other existing radar distance measuring methods may be employed as well.

A radar level gauge radiates microwave power and to get desired accuracy the occupied bandwidth is conventionally very big as compared to conventional radar such as surveillance radar on ships etc. Generally, due to the wide bandwidth practically no radiation in free space is allowable, since the outdoor frequency space is already sliced in narrow bands and designated for various types of use. There are no multi-GHz bands free and unused, at least not below 100 GHz.

RLGs are in use often fixedly mounted in structures such as, in the typical case, a closed metallic tank. Typically there is a need to keep the tank well closed, due to pressure differences, risk for leakage, etc. However, of the small microwave power used inside the tank a small fraction of it may escape from the tank and seen from the outside as emitted electromagnetic radiation without apparent directivity. The electromagnetic radiation outside the tank caused by the RLGs could thus appear like spurious radiation. Approvals for existing RLGs have among other been based on emission outside the tank which is below the same level as any kind of electronics is allowed to emit according to current EMC-rules. In a specific country or region this could mean emissions below 0.075–1 microwatt outside of the tank which by experience is feasible in conventional designs.

However, special measuring needs could require use of higher power etc. in RLGs, e.g. to measure longer distances, which could give an increase of microwave leakage when using the conventional designs of today. There could also be situations in which one would like to reduce the amount of escaping microwave power; e.g. local occurrence of special conditions or especially sensitive equipment are potential reasons to further reduce the amount of escaping MW power.

Thus, even if the RLG systems in use today generally have passed applicable type approval based on low emission outside the tank there is foreseen situations where a reduction of the emission is desirable, and situations could occur where one would like to reduce the amount of escaping microwave power.

SUMMARY OF THE INVENTION

It is therefore an object of the present invention to provide a radar level gauge system which at least partly alleviate the above-discussed problems of the prior art.

This object is achieved with a radar level gauge system according to the appended claims.

The radar level gauge (RLG) system of the invention is typically mounted in tanks which can have a height from a few meter to 20–30 m or even more and with volumes from a few m$^3$ and up to 100 000 m$^3$ or more, typically located outdoor. Frequencies around 6, 10 and 26 GHz could be used, but other frequencies, such as in higher frequency bands, are feasible as well, such as near 60 and 80 GHz. The RLG may use FMCW as the radar method (e.g. with a 1–2 GHz sweep), short pulses (e.g. in the range 0.5–1 ns), or other radar distance measuring methods. Due to the typically short distance and the need for low-power technology, very small microwave powers are often used, such as 1 mW pulse peak power or 1–100 W average power. Directive antennas pointing downwards are preferably used and the typical antenna gain may be in the range 100 to 1000. average power. Directive antennas pointing downwards are preferably used and the typical antenna gain may be in the range 100 to 1000.

The invention addresses the potential need that a reduction of the microwave power leakage from a RLG would be required and the basic idea is to make the tank more closed than is obtained by conventional flanges, gaskets and so on and still adopted for the standard needs like pressure sealing, minimum distortion of the signal transmission and compatible with antenna mounting and other functional needs for a RTG. The invention combines a pressure sealing and an electromagnetic sealing within the functional requirements for a RLG including minimum influence on the signal transmission, chemical compatibility and a geometry allowing standard antenna technology.

According to one aspect of the invention, there is provided a radar level gauge system for measuring a distance to a surface of a content in a container relatively to a measuring position, which is located above the surface and geometrically defined in relation to said container, said radar level gauge comprising:

a power supply interface for receiving electrical power to said radar level gauge, a communication interface for presenting externally of said radar level gauge information based on said distance;

a transmitter for generating and transmitting an electromagnetic transmitter signal;

means for directing said transmitter signal towards said surface and for receiving a reception pulse reflected back from said surface;

a receiver for receiving said reception pulse;

processing circuitry coupled to the transmitter and the receiver for determining said distance and to said communication interface for providing said information;

a fastening structure adapted to secure said means for directing in said measuring position, said fastening structure arranged to provide a spatial orientation of said means for directing, such that the directing of said transmitter signal is generally vertical, wherein said fastening structure has a first sealing surface adapted to mechanically couple with a second sealing surface of a feed-through structure located in an upper boundary of said container;

a sealing unit adapted to provide a pressure tight seal joint between said fastening structure and said feed-through when subjected to pressure between said first and second sealing surfaces; and means for blocking electromagnetic energy, adapted to suppress net transfer of electromagnetic energy through said sealing unit from the inside to the outside of said container.

It has been realized by the present inventor that a primary source for escaping electromagnetic radiation in RLG systems is at the flanges or hatches, and especially the flange or hatch where the RLG system is mounted. Accordingly, the provision of means for blocking electromagnetic energy, adapted to suppress net transfer of electromagnetic energy through said sealing unit from the inside to the outside of said container at such a position has proven remarkably efficient for significantly limiting the amount of escaping electromagnetic energy. It has been previously known to use e.g. sealing gaskets for electromagnetic leakage on protection boxes for electronics and there are several manufacturers of such EMC gaskets. Typically they are done of conductive material (woven metal, metal springs etc.) which makes a galvanic contact between the case and a cover which can be opened. However, such sealing gaskets have generally no pressure sealing function and are not intended for use in environment including liquids, gases etc. which is corrosive, hot etc. which is typical for the RLG application. Another kind of related prior art is the sealing method used on waveguides filled with pressurized gas (to increase their power handling capacity) where waveguide flange joints including O-rings for pressure sealing and quarter-wave pockets to increase radio-frequent losses are used. However, in such applications, there is no requirement for contact with corrosive material and the design is different as the waveguide joint is optimized for low influence inside, while the present RLG mountings are optimized for EM leakage to the outside. In RLG systems, there exist an inner side, a so called "wet side", which is exposed to the tank content, and which makes this environment very different from other types of systems.

The leakage of all holes located on the tank, and at least partly suppressible by the present invention, could be estimated in the following way. The power P is radiated from the antenna and it will be bouncing around a few times until it is absorbed. Due to fairly vertical mounting and the metal walls the loss at each bouncing will could be approximated by the reflection coefficient $|\rho|$ of the surface of the material and the average number of reflections will be $1/(1-|\rho|)$. Water ($\rho\sim0.8$) is the worst case while oil is more typical ($\rho\sim0.2$). With regard to the fact that the first reflection is by the liquid we can use the factor $|\rho|^2/(1-|\rho|)$ to estimate the fraction of the power P available for leakage at possible openings. For oil and water the factor is 0.05 and 3.2, respectively. If the total area of the openings is $A_{op}$ and the total area of the tank enclosure is $A_{encl}$ the power escaping from the tank can be roughly estimated as $(A_{op}/A_{encl})|\rho|^2/(1-|\rho|)P$. The majority of the openings are not openings but rather slots and they, as is known from prior art solutions, typically filled by some sealing material. For the whole tank the total area of the openings can be written as something like $A_{op}=\Sigma a_m+(\lambda/4)\Sigma\eta_n L_n$ where index m refers to real openings and index n to slots typically by flanges having the circumference $L_n$ and an efficiency $\eta_n$ indicating absorption in the sealing material. The factor $\lambda/4=0.5*\lambda/2$ is the effective width of the slots ($\lambda/2$) multiplied by the factor 0.5 for electromagnetic polarization.

The important point to be noted by this estimation is not primarily to purpose an exact estimation but to see some important factors influencing the amount of leakage. When looking on typical tanks it is e.g. to be noted that a big tank will typically have less leakage than a small tank.

The means for directing said transmitter signal towards said surface and for receiving a reception pulse reflected back from said surface could be realized in a number of ways. For example, a wave guiding structure could be provided extending into the content of the tank. The wave guiding structure can be a hollow wave guide or some sort of probe, such as a coaxial wire probe, a twin wire probe, or a single wire probe (also referred to as a surface wave guide). In such an embodiment, the electromagnetic waves transmitted along the structure will be reflected by any interface between materials in the tank, and the reflection will be transmitted back to the signal medium interface. Alternatively, and as is normally the case where e.g. the pulse is modulated on a high frequency carrier wave, the means for directing the signals comprises a signal medium interface connected to a radar antenna, arranged to emit the transmitted waves to freely propagate into the tank, and to receive waves that are reflected by any interface between materials in the tank. The means for directing the signals could be adjustable in order to control the direction of emission, but a fixed, uncontrollable direction is also feasible. Further, the means for directing the signals need not necessarily direct the signals in only one direction, but several directions, or a range of directions, could be used.

In one line of embodiments, the means for blocking electromagnetic energy is integrated in the sealing unit. For example, the sealing unit could comprise a sealing list or gasket made of a pressure sealing material and a microwave attenuating material.

Alternatively or additionally, the means for blocking electromagnetic energy could comprise at least one quarter-wave choke which is presenting a high impedance for surface currents which otherwise would have passed the choke. Such a quarterwave choke could be arranged as a recess in at least one of the first sealing surface of the fastening structure and the second sealing surface of the feed-through structure, be provided by a protrusion in at least one of the first sealing surface of the fastening structure and the second sealing surface of the feed-through structure, be arranged as an open compartment arranged on top of at least one of the first sealing surface of the fastening structure and the second sealing surface of the feed-through structure, or the like. Further, the quarterwave choke could be at least partly filled with dielectric material.

Preferably, a microwave attenuating material used in the present invention has a resistivity which is less than 1 ohm-meter.

Further, it is preferred that the means for blocking electromagnetic energy provides a microwave attenuation of at least 10 dB, and most preferably at least 20 dB, as compared to the leakage with a conventional flange sealed material with low loss or no conductivity.

The means for blocking electromagnetic energy is preferably adapted to be located outside the pressure tight seal joint provided by the sealing unit in relation to the tank inside. In this way, the sealing unit faces the wet side of the tank, and thereby protects the means for blocking electromagnetic energy from contamination, corrosion, etc. by the tank content.

Still further, the means for blocking electromagnetic energy is preferably attached to the fastening structure, and most preferably on or in the vicinity of the first sealing surface of the fastening structure. Hereby, said means could e.g. be connected or integrated with the fastening structure before mounting of the system on the tank, which e.g. provides better control for the manufacturer, a more expedient mounting operation, etc.

According to another aspect of the invention, there is provided a radar level gauge system for determining a filling level of a filling material in a container comprising:

a transmitter for transmitting measuring signals towards the surface of the filling material;

a receiver for receiving echo signals from said surface;

processing circuitry for determining the filling level of the container based on said echo signal;

a fastening structure adapted to secure said transmitter and receiver in a measuring position, wherein said fastening structure has a first sealing surface adapted to mechanically couple with a second sealing surface of a feed-through structure located in an upper boundary of said container;

a sealing unit arranged between said first surface of the fastening structure and said second surface of the feed-through, and adapted to provide a pressure seal between the inside and the outside of the container; and means for blocking electromagnetic energy, adapted to block net transfer of electromagnetic energy between the inside and the outside of the container through said sealing unit.

With this aspect of the invention, similar advantages as discussed above with relation to the first aspect are obtainable.

According to still another aspect of the invention, there is provided a radar level gauge system for determining a filling level of a filling material in a container comprising:

a transmitter for transmitting measuring signals towards the surface of the filling material;

a receiver for receiving echo signals from said surface;

a fastening structure adapted to secure said transmitter and receiver in a measuring position on a feed-through structure located in an upper boundary of said container;

a sealing unit arranged between said fastening structure and said feed-through, and adapted to provide a pressure seal between the inside and the outside of the container; and means for blocking electromagnetic energy, adapted to block net transfer of electromagnetic energy between the inside and the outside of the container through said sealing unit.

With this aspect, similar advantages as discussed above with relation to the first aspects are obtainable.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
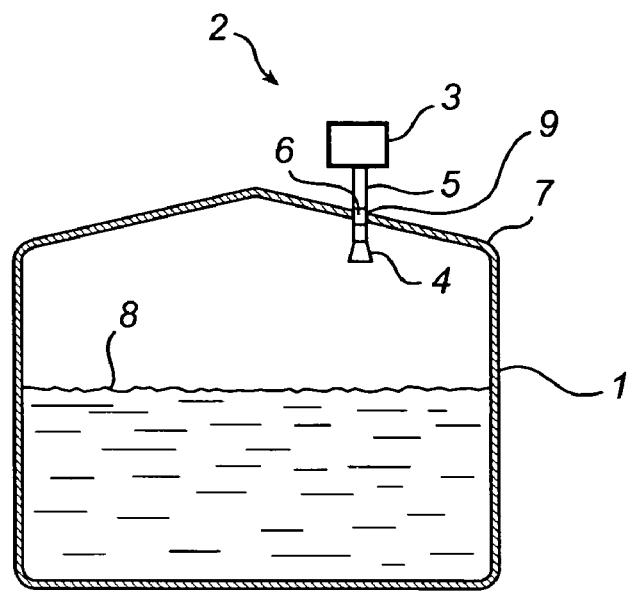
FIG. 1 is a schematic cross-sectional side view of a container, in which radar level gauge system according to the embodiment is arranged.

FIG. 1 shows schematically a tank 1 provided with a radar level gauge system 2. In brief, the system in FIG. 1 comprises an electronic unit 3 for transmitting and receiving radar signals and processing the received signals in order to determine the level in the tank, an antenna 4 arranged inside the tank for transmitting and receiving radar waves into the tank, and a radar wave guide assembly 5 for guiding signals between the electronic unit 3 and the antenna 4. In order to maintain temperature and pressure in the tank, and to protect the outside environment from the tank contents, a wave guide sealing 6 is arranged close to where the wave guide 5 passes through the tank wall 7 to provide sealing of the tank 1. The same antenna could preferably be used both as a transmitter for emitting the output radiation and as a receiver for receiving the reflected echo signal, even though it is also possible to use separate antennas for these functions.

In use, the radar level gauge 2 transmits radar energy along the waveguide, 5 through the tank roof port and receives reflected energy from the liquid surface 8 to provide an indication of the level of the liquid within the tank. The radar level gauge 2 could be coupled to a remote location (for example a control room) via a signal wire or the like.

Figure 2:
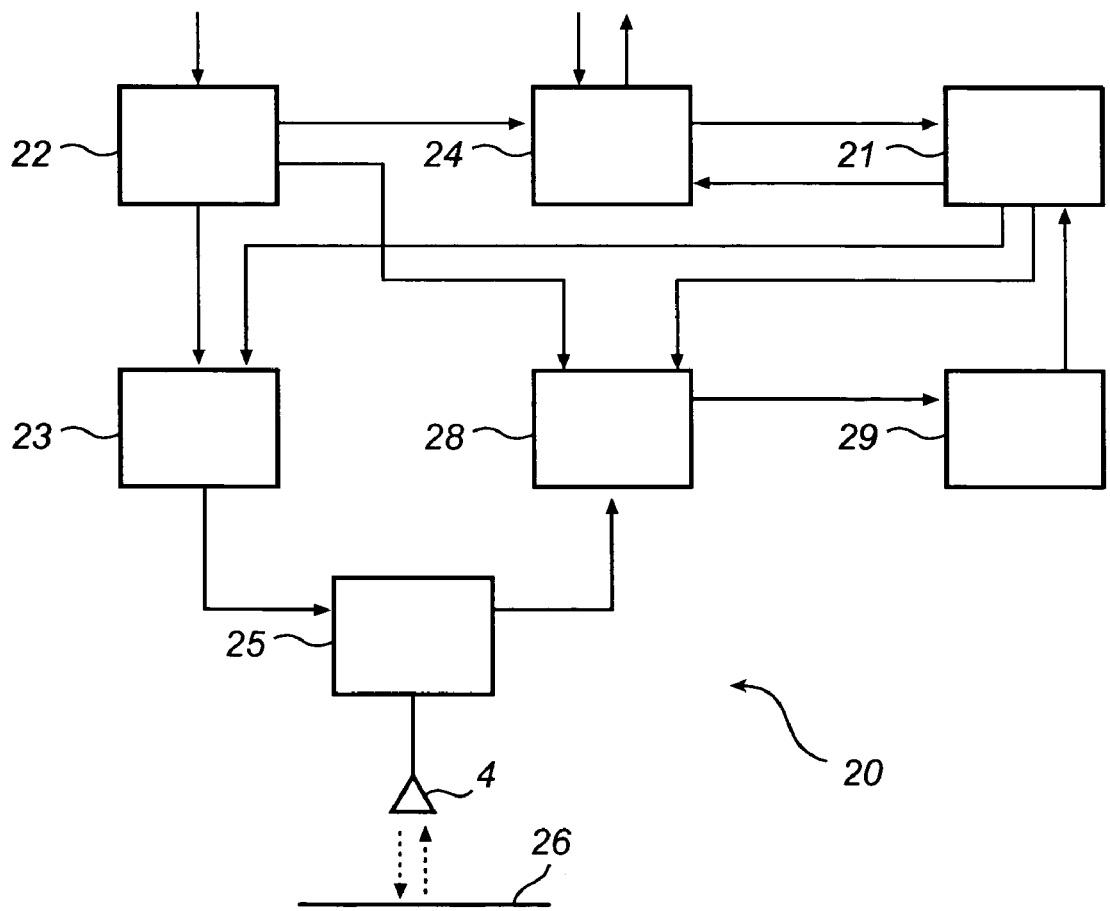
FIG. 2 is a schematic block diagram illustrating a radar level gauge system in which an embodiment according to the invention can be used.

In the general embodiment shown in FIG. 2, the circuitry 20 includes a signal processor 21, a transmitter 23, a receiver 28 and signal processing circuits 29 preparing the received signals to the processor 21. The circuitry further includes a transmit/receive (TR) coupler 25 which connects the transmitter 23 and the receiver 28 with the antenna 4 which is directing signals towards the surface 26 of the material the level of which is to be measured. The TR-coupler 25 can be a directional coupler, a ferrite circulator or any other conventional component. The circuitry also includes at least power circuits 22 and communication circuits 24 which both can be of many types.

The RLG could use short pulses to measure the distance or continuously emitted radiation having a frequency sweep (FMCW) as well an other radar distance measuring methods.

The signal processor 21 is preferably a microprocessor based circuit adapted to receive the incoming signal, as discussed above, and provide as an output a signal or information indicative of the level of material 8. The functions and algorithms implemented by the signal processor, some of which can be embodied in hardware and some of which can be embodied in software, are per se known from the art will not be discussed further in this application.

The RLG as discussed above is connected to the tank by means of a fastening structure, as illustrated in FIGS. 3–12, adapted to secure the RLG, or at least the transmitter and receiver thereof, in a measuring position. The fastening structure is preferably arranged to provide a spatial orientation for the radiation directing equipment, such that the directing of said transmitter signal is generally vertical towards the surface of the filling material. The fastening structure preferably comprises a first sealing surface 10 adapted to mechanically couple with a second sealing surface 11 of a feed-through structure located in an upper boundary of said container. The mechanical coupling could e.g. comprise bolts 12 or the like.

A sealing unit 6 is preferably arranged between said first and second sealing surfaces, in order to maintain pressure in the tank, and to protect the outside environment from the tank contents, and to provide sealing of the tank 1. Further, means 9 for blocking electromagnetic energy is arranged to suppress net transfer of electromagnetic energy through said sealing unit from the inside to the outside of said container. Many different alternative realizations of said sealing unit and said blocking means are feasible, of which some will be discussed more thoroughly in the following. The sealing unit and blocking means is in the following discussed as being arranged in the connection between the RLG and the tank. However, it should be realized by those versed in the art that similar sealing units and blocking means may also be used in other openings, flanges and hatches of the tank in order to provide efficient sealing of the tank. Depending on the intended use of the tank, the sealing unit and blocking means is preferably provided with an ability to withstand contamination with e.g. the tank content and are preferably also compatible with standardized pressure sealing practice without adding excessive costs.

The ideas of the invention for a sealing unit can be implemented in numerous ways to combine the electromagnetic (EM) sealing with the pressure sealing and that ability to survive the corrosive liquids on the wet side of the sealing. A wide group of implementations of the sealing unit use two (or possibly more) sealing elements one optimized for pressure sealing, consequently usable on the wet side etc., and one for electromagnetic sealing. In case of two combined elements a division can be made depending on which one is located on the wet side. With two specialized sealing elements it is likely that a top function is easier to obtain by using well proven solutions but there is also a possibility to combine all three functions —EM-sealing, pressure sealing and ability to survive as a wetted part —in one simpler unit. Among possible sealing elements both materials and geometry can be used. Plastic materials or elastomers filled to be highly conductive (such as <1 ohm:meter) are together with metallic gaskets examples of the first type and pockets preventing current flow over the used frequency band, best known as quarter wave choke, and an optimized width of the gasket, such as a quarter of a wavelength, are examples of the second group. The EM leakage through a flange is not much dependent of the width of the flange, as long as the width is "small" as compared to the radar wavelength, and about the same for a gasket of a material having low dielectric constant, such as PTFE, as can be measured for the same layer of air. With that starting point the extra attenuation caused by a sealing unit according to the invention can be measured and with regard to the general variation of measured EM leakage a desired extra attenuation as at least 10 dB (10 times in power) or preferably 20 dB (100 times in power) can be quantified.

Figure 3A:
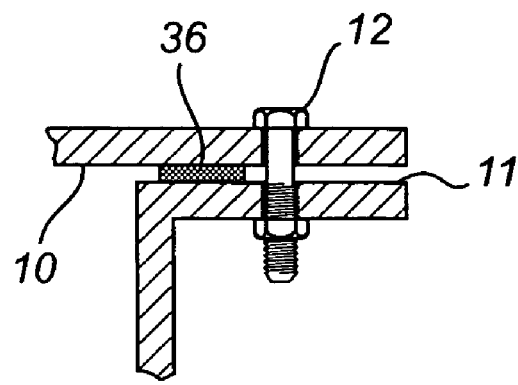
FIGS. 3–12 are schematic cross-sectional side views of a sealing and fastening structure for a radar level gauge system according to different embodiments of the invention.
Figure 3B:
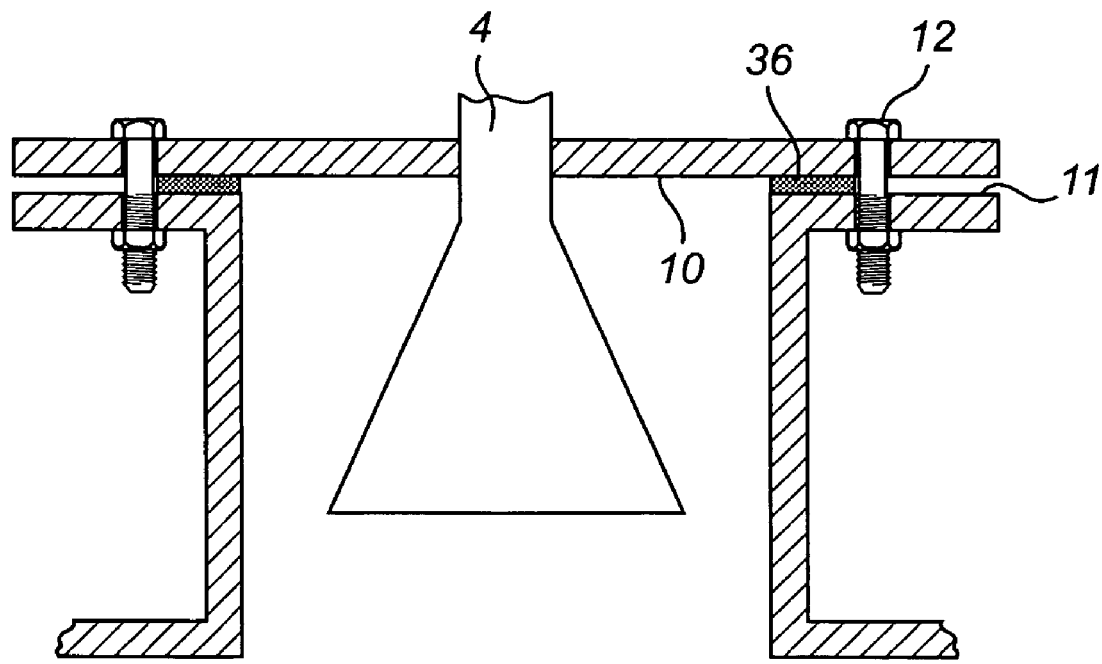

In a first exemplary embodiment, illustrated in FIGS. 3a and 3b, a sealing and blocking unit 36 is provided, being an integrated means for blocking electromagnetic energy and sealing unit. The sealing and blocking unit could be of any standard geometry, but is preferably in the form of a sealing list or gasket. Further, it is preferably made of a combination of a pressure sealing material and a microwave attenuating material. Metal seals and carbon filled elastomer are two examples suitable for many shapes. PTFE with various fillings, such as carbon powder, carbon fibres or metal fibres, will also decrease the cold-flow and increase the compressive strength. Alternatively or additionally, an adequate blocking of electromagnetic waves could also be provided by the provision of a suitable width of the sealing and blocking unit. In such an embodiment, the width is preferably a quarter of a wavelength for the primary electromagnetic frequency used, such as about 8–9 mm at 6 GHz. In this embodiment, the sealing material need not have any specific blocking properties per se, and unfilled PTFE could e.g. be used, even if both the above-discussed blocking principles may also be employed in combination.

Figure 4:
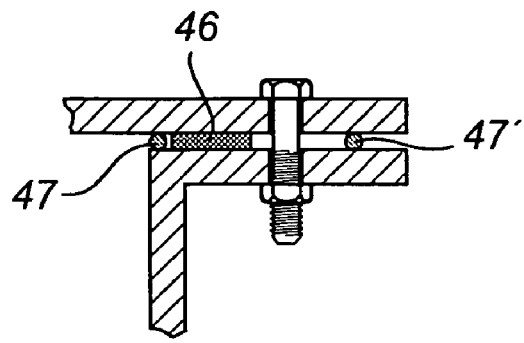

In a second exemplary embodiment, illustrated in FIG. 4, separate sealing unit 46 and blocking unit 47 are provided. The sealing unit could be any sealing means, such as a standrad seal, as is per se known in the art. The blocking unit 47 is preferably of a microwave attenuating material, such as a carbon filled elastomer. Further, ribbons or O-rings of woven metal, finger-shaper metal or silver filled rubber etc. could be used as the microwave material. The blocking unit could be a arranged as a list or gasket or an O-ring seal, and could be arranged inside the sealing unit 46, as is illustrated by position 47, or outside the sealing unit, as illustrated by position 47'. Depending on the use of the tank a mounting of the EM sealing outside can be done using a standard type of such a sealing and possibly at a later stage while the mechanically more protected mounting inside will normally require another type of EM-sealing. Several blocking units and/or sealing units may also be employed. For example, a blocking list or gasket 47, 47' may be arranged both on the inside and outside of the sealing unit 46.

The blocking means for suppressing electromagnetic waves could also be realize as quarterwave chokes or other types of chokes. Many different quarterwave arrangements are possible, but some illustrative examples will be discussed briefly below.

Figure 5:
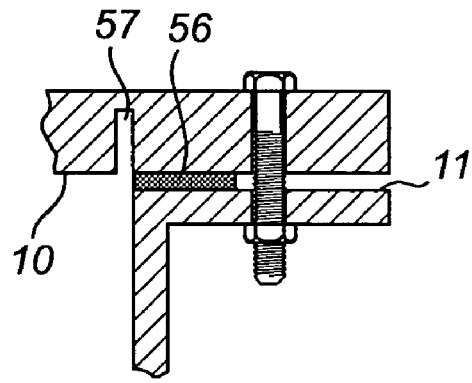

In one exemplary embodiment, illustrated in FIG. 5, separate sealing unit 56 and blocking means 57 are provided. The sealing unit could be any sealing means, such as a standard seal, as is per se known in the art. The blocking means 57 is in this embodiment a quarterwave choke provided as a recess arranged in the first surface 10 of the fastening structure, in the vicinity of the second surface 11 of the feed-through structure. The recess has preferably a depth corresponding to a quarter of the wavelength of the primary electromagnetic radiation frequency used by the RLG, and with a comparatively limited opening width. The function of the choke is to present a high impedance over its opening preventing current at the used frequency band to flow. By locating the opening of the choke close to the inner opening between the two sealing surfaces of the flange, current can be prevented from flowing between the two sealing surfaces, and consequently to reach the surrounding. The choke or pocket can be empty or preferably filled with a dielectric material, which in that case preferably has a low conductivity. Additionally or alternatively, a quarterwave recess may also be arranged in the second surface, in the vicinity of the first surface.

Figure 6:
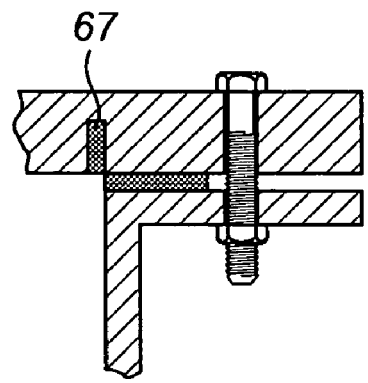

A further exemplary embodiment, illustrated in FIG. 6, essentially corresponds to the embodiment discussed in relation to FIG. 5, but in this embodiment the blocking means 67 is a recess filled with a filling material, and preferably a dielectric material.

Figure 7:
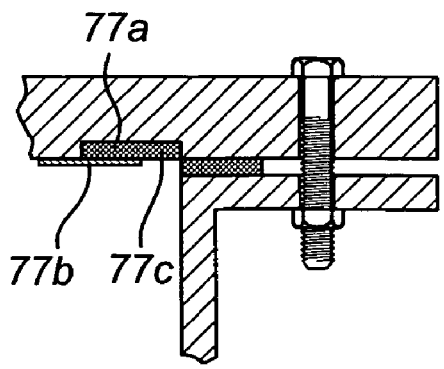

Alternatively, it is possible to arrange the quarterwave recess in a direction parallel to the plane of the first surface, instead of perpendicular to said surface. One such example is illustrated in FIG. 7. In this embodiment, a recess 77*a* is provided in the first surface, with a width essentially corresponding to a quarter of the primary wavelength to be attenuated, and a relatively limited depth. The recess could be filled with a filling material, such as a dielectric material. Further, a plate 77*b*, preferably of a conductive material, is arranged to cover most of the recess 77*a*, leaving a relatively narrow opening 77*c* in the vicinity of the second surface and close to the beginning of the flange gap.

Figure 8:
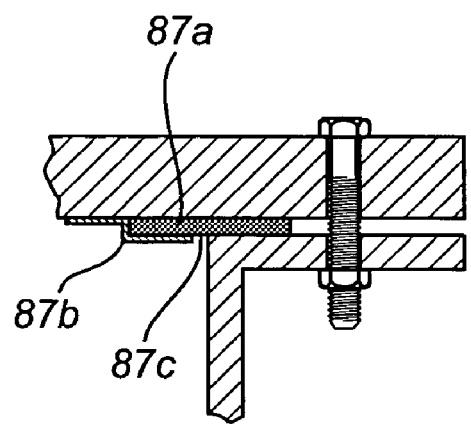

Still another embodiment, illustrated in FIG. 8, essentially corresponds to the embodiment discussed in relation to FIG. 7. However, in this embodiment, no recess is arranged in the first or second surface. Instead, the plate 87*b* is arranged to provide a closed compartment 87*a*, said compartment having a width essentially corresponding to a quarter of the primary wavelength to be attenuated, and a relatively limited depth. The recess could be filled with a filling material, such as a dielectric material. Further, a relatively narrow opening 77*c* of the compartment is arranged in the vicinity of the junction between the first and second surface.

As already discussed, the quarterwave choke may be arranged in both the first and second surface.

Figure 9:
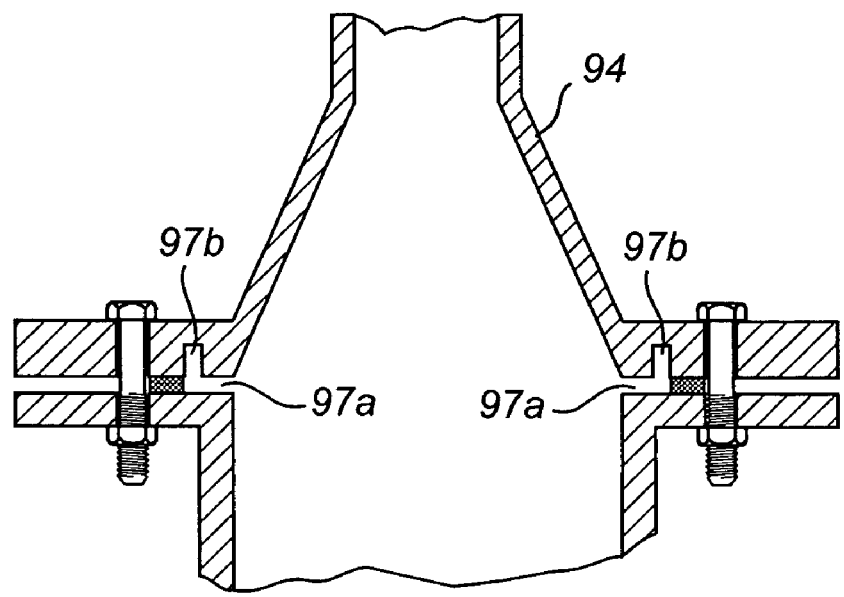

FIG. 9 shows another embodiment where the conical antenna 94 is visible from outside and welded to a flange where a quarter-wave choke 97*b* is made in the antenna flange with a gasket on one side and another quarter-wave piece 97*a* goes in towards the antenna horn. This way is an efficient sealing even without a conductive or lossy sealing.

Figure 10:
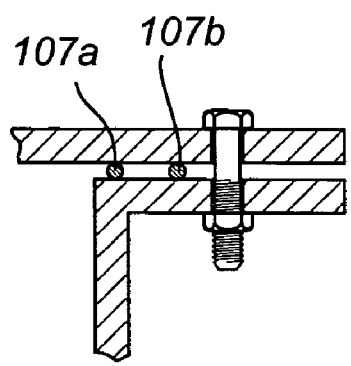
Figure 11:
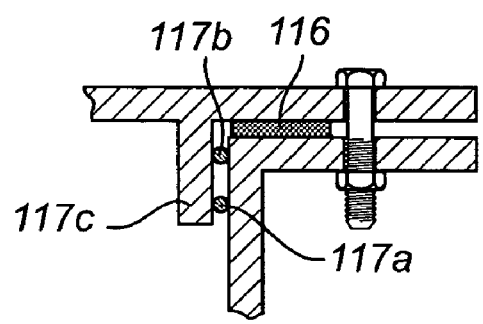

In still another exemplary embodiment, illustrated in FIG. 10, a sealing and blocking unit is provided, comprising two seals 107*a*, 107*b* are provided, with a quarter wave distance between them. The seals could be seal lists, O-rings or the like, and could be made of any sealing material, such as PTFE, as is per se known in the art. Alternatively, the first surface may be provided with a protruding portion 117*c* close to the second surface, in order to provide a so-called spigot joint, as is schematically illustrated in FIG. 11. Further, a sealing unit 116 may be arranged between the first and second surface, as in previously discussed embodiments. The length of the protruding portion 117*c* could in this embodiment correspond to about a quarter of the primary wavelength to be attenuated. Alternatively or additionally, two seals 117*a*, 117*b* could be provided between the protruding portion 117*c* and the second surface, with a quarter wave distance between them.

Figure 12:
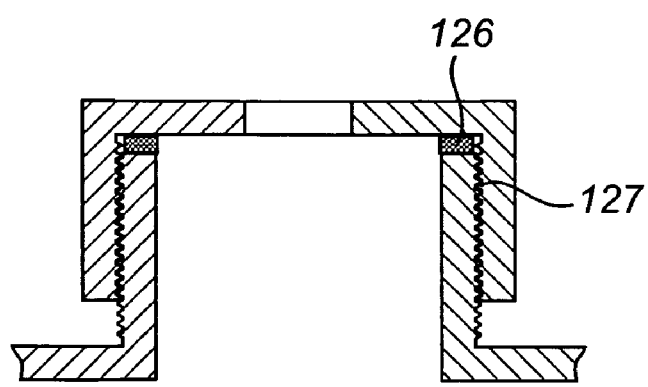

Still another exemplary embodiment is illustrated in FIG. 12. In this example, there is provided a threaded connection 127 between the first and second surface, said threaded connection providing attenuation of electromagnetic radiation. Further, a sealing unit 126 may be arranged between the first and second surface, as in previously discussed embodiments. In this case the EM sealing is preferably rather soft as the thread typically is a slightly conical thread (such as a NPT-thread) which is tightened until a partly metallic contact. Typically the thread is filled with some material which can be a possibly carbon filled PTFE ribbon.

The sealing and blocking arrangements discussed above are applicable to essentially all kind of mountings including standard flanges adopted for flat sealings, flanges adopted for O-rings, threaded joints, spigot joints or other shapes. The fixed part on the tank need not be modified to use the described sealing. Typical diameters for the flanges are 1", 2", 3", 4", 6", 8", 10" and 12", while threaded joints are typically smaller, e.g. 1", 1.5" or 2".

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, the proposed sealing and blocking arrangement may be used in different types of level gauge systems. Such and other obvious modifications must be considered to be within the scope of the present invention, as it is defined by the appended claims.

What is claimed is:

1. A radar level gauge system for measuring a distance to a surface of a content in a container relatively to a measuring position, which is located above the surface and geometrically defined in relation to said container, said radar level gauge comprising:

a power supply interface for receiving electrical power to said radar level gauge, a communication interface for presenting externally of said radar level gauge information based on said measured distance;

a transmitter for generating and transmitting an electromagnetic transmitter signal;

means for directing said transmitter signal towards said surface and for receiving a reception pulse reflected back from said surface;

a receiver for receiving said reception pulse;

processing circuitry coupled to the transmitter and the receiver for determining said distance and to said communication interface for providing said information;

a fastening structure adapted to secure said means for directing in said measuring position, said fastening structure arranged to provide a spatial orientation of said means for directing, such that the directing of said transmitter signal is generally vertical, wherein said fastening structure has a first sealing surface adapted to mechanically couple with a second sealing surface of a feed-through structure located in an upper boundary of said container;

a sealing unit adapted to provide a pressure tight seal joint between said fastening structure and said feed-through when subjected to pressure between said first and second sealing surfaces; and means for blocking electromagnetic energy, adapted to suppress net transfer of electromagnetic energy through said sealing unit from the inside to the outside of said container;

wherein the sealing unit comprises a sealing list or gasket made of a pressure sealing material and a microwave attenuating material, whereby the means for blocking electromagnetic energy is integrated in the sealing unit; and wherein said sealing unit constitutes the single pressure sealing means provided between said fastening structure and said feed-through structure.

2. The radar level gauge system of claim 1, wherein the means for blocking electromagnetic energy further comprises at least one quarterwave choke.

3. The radar level gauge system of claim 2, wherein the quarterwave choke is arranged as a recess in at least one of the first sealing surface of the fastening structure and the second sealing surface of the feed-through structure.

4. The radar level gauge system of claim 2, wherein the quarterwave choke is provided by a protrusion in at least one of the first sealing surface of the fastening structure and the second sealing surface of the feed-through structure.

5. The radar level gauge system of claim 2, wherein the quarterwave choke is arranged as an open compartment arranged on top of at least one of the first sealing surface of the fastening structure and the second sealing surface of the feed-through structure.

6. The radar level gauge system of claim 2, wherein the quarterwave choke is at least partly filled with dielectric material.

7. The radar level gauge system of claim 1, wherein the microwave attenuating material has a resistivity which is less than 1 ohm-meter.

8. The radar level gauge system of claim 1, wherein the means for blocking electromagnetic energy provides a microwave attenuation of at least 10 dB.

9. The radar level gauge system of claim 8, wherein the means for blocking electromagnetic energy provides a microwave attenuation of at least 20 dB.

10. A radar level gauge system for determining a filling level of a filling material in a container comprising:

a transmitter for transmitting measuring signals towards the surface of the filling material;

a receiver for receiving echo signals from said surface;

a fastening structure adapted to secure said transmitter and receiver in a measuring position on a feed-through structure located in an upper boundary of said container;

a sealing unit arranged between said fastening structure and said feed-through, and adapted to provide a pressure seal between the inside and the outside of the container; and means for blocking electromagnetic energy, adapted to block net transfer of electromagnetic energy between the inside and the outside of the container through said sealing unit;

wherein the sealing unit comprises a sealing list or gasket made of a pressure sealing material and a microwave attenuating material, whereby the means for blocking electromagnetic energy is integrated in the sealing unit; and wherein said sealing unit constitutes the single pressure sealing means provided between said fastening structure and said feed-through.

* * * * *

UNITED STATES PATENT AND TRADEMARK OFFICE
CERTIFICATE OF CORRECTION

PATENT NO. : 7,239,267 B2
APPLICATION NO. : 10/957279
DATED : July 3, 2007
INVENTOR(S) : Olov Edvardsson Page 1 of 1

It is certified that error appears in the above-identified patent and that said Letters Patent is hereby corrected as shown below:

Under (75) Inventor: add -- Mats Nordlund, Molndal, (SE) --.

Under (73) Assignee: change "Gothenburg (SE)" to --Goteborg (SE) --.

Under (74) Attorney, Agent, or Firm: change "Westerman" to --Westman--.

Signed and Sealed this

Eighteenth Day of September, 2007

JON W. DUDAS
*Director of the United States Patent and Trademark Office*